P. J. THEUS.
PEANUT PICKER.
APPLICATION FILED OCT. 20, 1911.

1,022,342.

Patented Apr. 2, 1912.

3 SHEETS—SHEET 1.

Witnesses
Harry M. Test

Inventor
P. J. Theus,
By
Harry Ellis Chauck Attorney

COLUMBIA PLANOGRAPH CO., WASHINGTON, D. C.

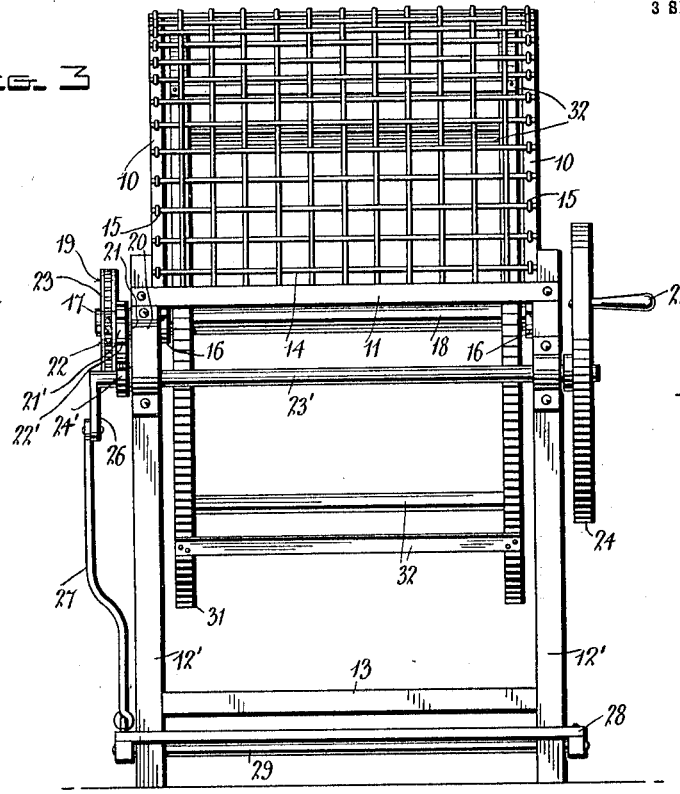

P. J. THEUS.
PEANUT PICKER.
APPLICATION FILED OCT. 20, 1911.
1,022,342.
Patented Apr. 2, 1912.
3 SHEETS—SHEET 3.
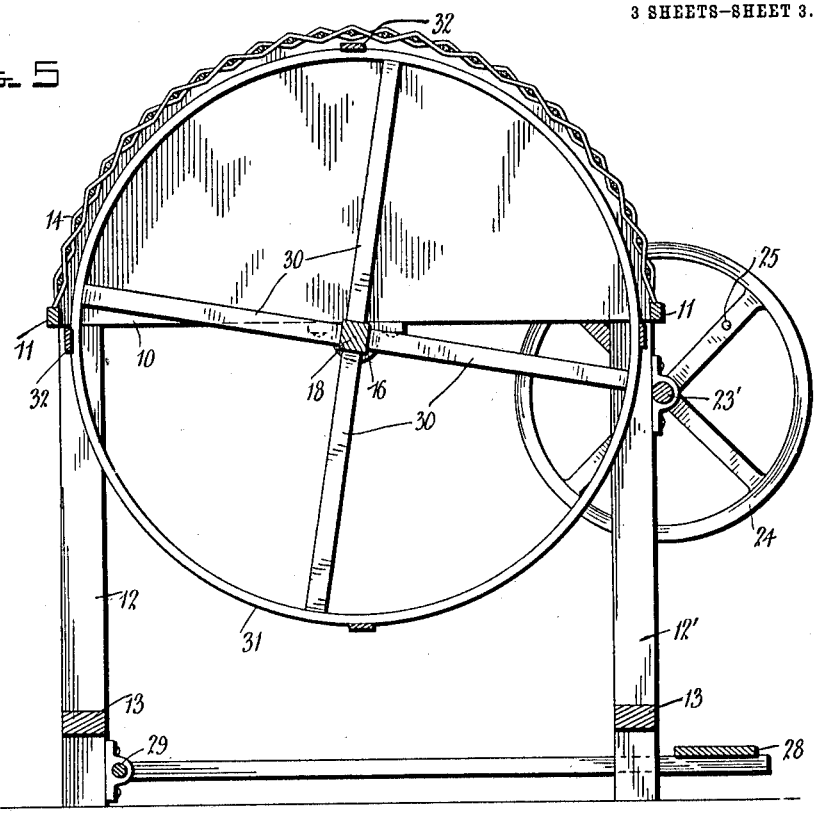
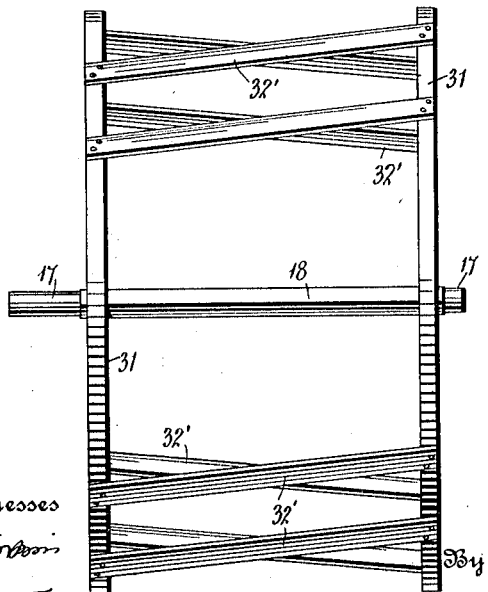
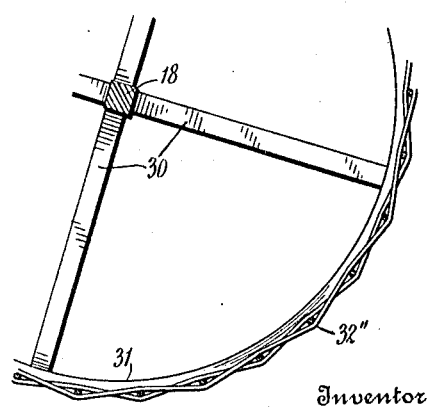
Inventor
P. J. Theus,
Witnesses
By
Attorney

UNITED STATES PATENT OFFICE.

PAUL J. THEUS, OF OCALA, FLORIDA.

PEANUT-PICKER.

1,022,342.  Specification of Letters Patent. Patented Apr. 2, 1912.

Application filed October 20, 1911. Serial No. 655,766.

*To all whom it may concern:*

Be it known that I, PAUL J. THEUS, a citizen of the United States, residing at Ocala, in the county of Marion and State of Florida, have invented certain new and useful Improvements in Peanut-Pickers, of which the following is a specification.

This invention relates to improvements in machines for picking peanuts or the like, and particularly for stripping the peanuts from the vines after the vines have been pulled up.

One object of the invention is to provide a device of this character whereby the peanuts will be stripped from the vines in a clean, whole condition, and the liability of breaking or cutting them reduced to a minimum.

Another object is to provide a peanut stripping machine which is simple in construction, and one which will require very little labor to operate it.

A further object is to provide an intermittently driven rotatable stripper whereby the peanuts may be fed when the stripper is stationary.

These and other objects will be apparent from the following description and with particular reference to the accompanying drawings.

Figure 1:
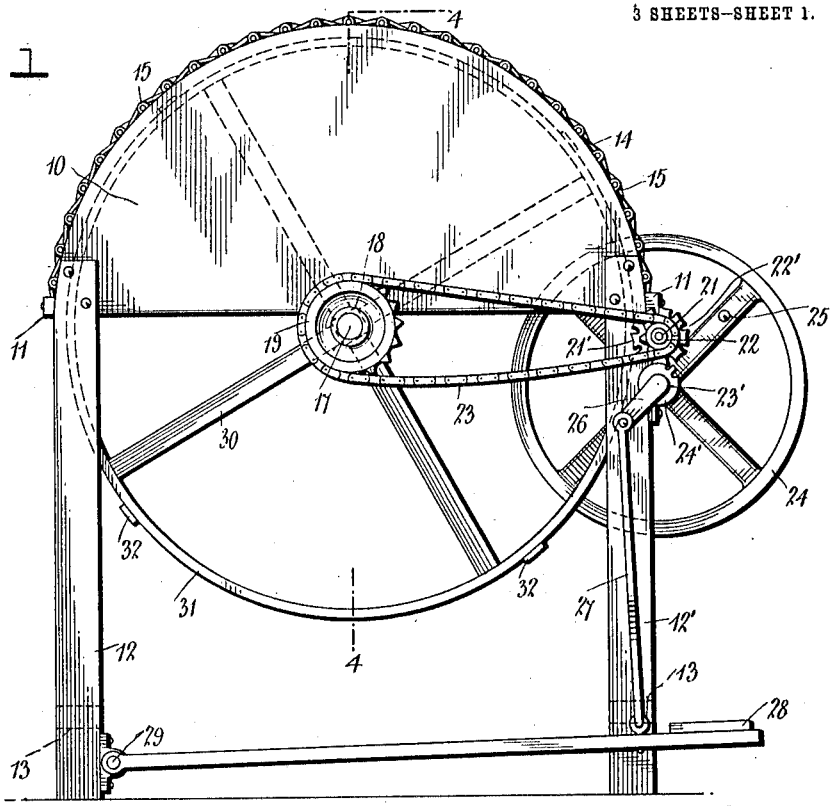
Figure 2:
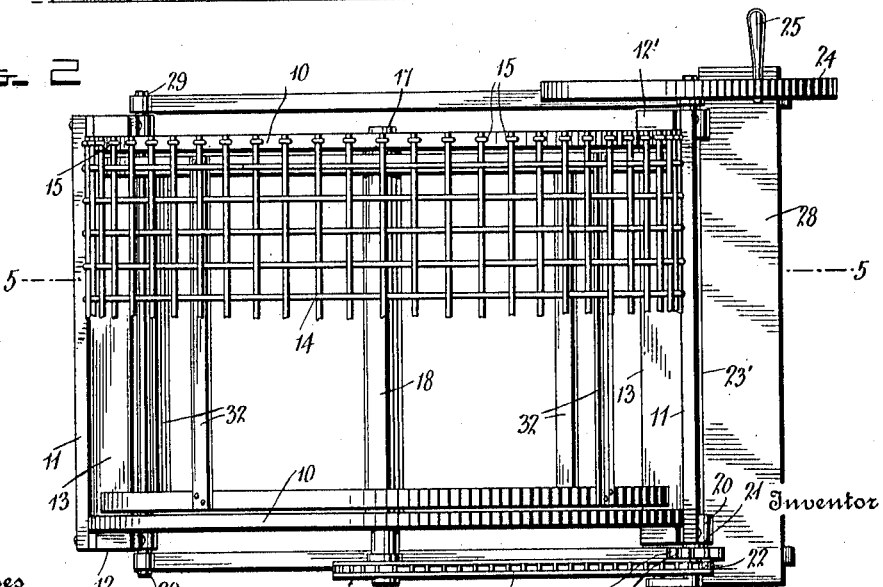

In the drawings: Figure 1 is a side elevation of the machine, Fig. 2 is a top plan view, Fig. 3 is an end elevation, Fig. 4 is a vertical transverse section on the line 4—4 of Fig. 1, Fig. 5 is a vertical longitudinal section on the line 5—5 of Fig. 2, Fig. 6 is a fragmentary detail of a modified form of the rotary stripper, Fig. 7 is a fragmentary detail of a further modification of the rotary stripper, and Fig. 8 is a detail of a straight continuous gearing.

Referring particularly to the drawings it will be seen that the machine comprises a frame including the semi-circular side boards 10 connected together at their lower portions by the cross braces 11, and supported by the legs 12, which are secured to the boards 10 at opposite ends, said legs being suitably spaced apart by the braces 13. Secured over the upper curved edges of the boards 10 is a wire screen 14, secured thereto by any suitable means, as the staples 15. As clearly shown this wire screen extends from one end of the curved edge of the boards across the top of the machine and to the other end, the size of the screen being sufficient for the passage of peanuts therethrough. Secured centrally to each of the straight lower edges of the boards 10 is a block 16 in which blocks are journaled the rounded trunnion ends 17 of the shaft 18, one end of the said shaft being provided with a sprocket wheel 19. Mounted on one of the legs 12 in a suitable bearing block 20 is the shaft 21, which carries a smaller sprocket wheel 22, over which, and over the sprocket 19 passes a sprocket chain 23. On the shaft 21, adjacent the sprocket 22 is a gear 21' provided with the notches 22'. On a shaft 23' mounted below the shaft 21 is a single toothed gear 24', the tooth of which is adapted for engagement in the notches 22', so that an intermittent rotary movement is imparted to the rotary stripper, to permit the ready insertion of the peanuts through the screen during the stationary periods of the stripper. On one end of the shaft 23' is a crank 26 which is connected by means of the link 27 to a treadle 28 pivotally mounted at 29 at the opposite end of the machine. On the opposite end of the shaft 23' is a fly wheel 24 provided with a suitable crank handle 25 to rotate the same. It will thus be seen that the machine may be operated by hand or by foot, or by a suitable motor, by providing the pulley 26' so that both hands may be used to feed the vines through the machine.

Extending radially from each end of the shaft 18 are the spokes 30, and secured to the ends of each set of spokes is a hoop or ring 31, said spokes being of such length as to permit the said rings to rotate concentrically of and close under the wire screen 14. Secured to the rings 31 and extending therebetween are the bars 32, at suitably spaced intervals around said rings.

In the operation of the device, the vines which have been pulled are first shaken to remove the greater portion of the earth and then presented to the machine by holding the vines in such manner that the peanuts pass through the meshes of the screen. At the same time the rotary stripper is rotated which causes the bars 32 to engage the peanuts at or nearly by their stem portions, dragging them against the wires of the screen and pulling the stems off so that the peanuts may drop through the screen to the ground or be caught in a suitable receptacle, not shown.

Referring particularly to Fig. 6 it will be seen that I provide a plurality of groups of bars 32', said bars being secured to the rings, parallel to each other, but diagonally across the rings, so that a shearing action will take place when said bars engage the peanuts so that the stems will be drawn into the angle formed by the straight cross members of the screens and the diagonal bars to more readily break the stems and remove the peanuts. The idea in this form is to present the peanuts through the screen and between the bars 32' when one of the groups comes in register with the screen.

In the modification shown in Fig. 7 the bars 32 and 32' are supplemented by the wire screen 32'' which is stretched across the rings 31, the openings of which are about twice the size of those of the screen 14. If desired a plain gearing may be employed, such as illustrated in Fig. 8, so that the rotation of the stripper will be continuous instead of intermittent.

From the foregoing it will readily be seen that with a device constructed as shown and described, it is simple in construction and can be operated with very little labor. It will also be noted that by extending the screen 14 over the top and end of the machine, the vines can be presented at several places at once, thus greatly increasing the capacity and output of the machine.

The bars 32 and 32' have blunt operating edges, so that the danger of cutting the peanuts is reduced to a minimum, the action being to shear the stem between the bars and the cross members of the screen so that the stems will be more readily broken. Should the bars engage the peanuts at any other place than the stem portion the nuts would be dragged so that the stem would be snapped.

What I claim is:

1. A peanut stripping machine comprising a stationary open-work element a rotating open-work stripping element, and intermittent driving means for the latter, whereby said rotating element is at times stationary and in register with the stationary element.

2. In a peanut stripping machine, a curved stationary open-work element, a rotating member having its periphery concentric with and adjacent the stationary element, diagonally arranged stripper bars mounted transversely on the rotating member for coaction with the stationary element to engage the stems of peanuts, and means for intermittently rotating the rotating member, whereby the rotating member is at times stationary and in register with the stationary element.

3. A peanut stripping machine comprising a stationary open-work element, a rotating stripping element disposed in close concentric relation thereto, said rotating element including a shaft, parallel rings secured thereto, a plurality of groups of bars on the rings arranged in parallelism with each other, said groups of bars being arranged diagonally with respect to the stationary element, and means for intermittently rotating the stripping element, whereby the stripping element is stationary and in register with the stationary element, at times, and produces a shearing action between the stationary and rotating elements when the latter is in motion.

In testimony whereof I affix my signature, in the presence of two witnesses.

PAUL J. THEUS.

Witnesses:
 HARRY M. TEST,
 FRANCIS BOYLE.

---

Copies of this patent may be obtained for five cents each, by addressing the "Commissioner of Patents, Washington, D. C."